Jan. 10, 1928.
A. P. HAWN
1,656,064
GASOLINE GAUGE
Filed March 11, 1927
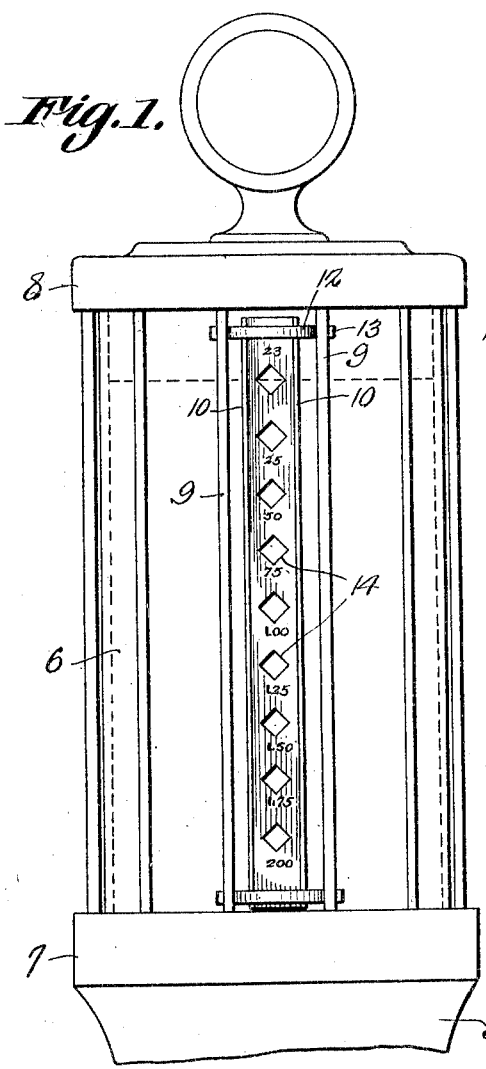
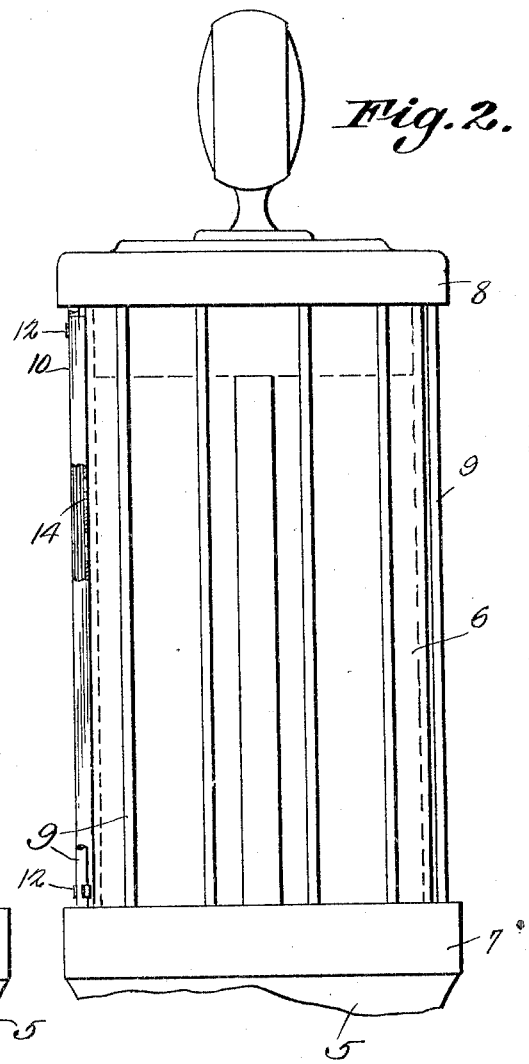
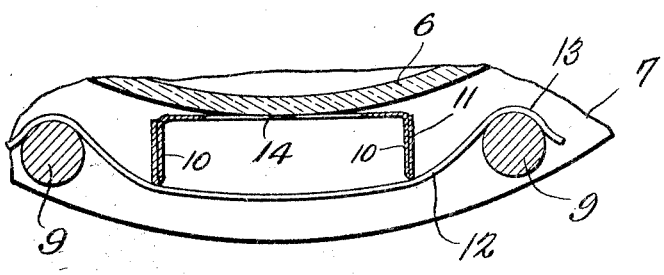
Inventor
A. P. Hawn
By C A Snow & Co.
Attorneys.

Patented Jan. 10, 1928.

1,656,064

UNITED STATES PATENT OFFICE.

ANDREW P. HAWN, OF GOODLAND, INDIANA.

GASOLINE GAUGE.

Application filed March 11, 1927. Serial No. 174,547.

The present invention relates to removable gauges especially designed for use in connection with gasoline dispensing stands of the visible tank type, and aims to provide a gauge so constructed that gasoline may be sold by value and not quantity.

An important object of the invention is to provide a gauge of this character which may be readily and easily removed and replaced by a gauge having a different scale of price numbers thereon, thereby compensating for changes in the price of gasoline.

A still further object of the invention is to provide a gauge having lateral parallel flanges and having rectangular openings between the flanges, so that the gauge may be read easily by persons standing directly in front of the gauge.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is an elevational view of a tank equipped with a gauge constructed in accordance with the invention.

Figure 2 is a side elevational view thereof, a portion of the gauge being broken away.

Figure 3 is a transverse sectional view through the gauge.

Referring to the drawing in detail, the reference character 5 indicates the stand on which the visible tank 6 is supported and in which the gasoline is pumped in the dispensing of a quantity of gasoline.

The tank 6 is of the usual construction and includes a bottom 7 and a top 8 held in spaced relation with each other by means of the vertical rods 9, the same being arranged in spaced relation with each other, as shown by the drawing.

The gauge, forming the essence of this invention includes an elongated body portion formed preferably of sheet metal and provided with lateral flanges 10 which extend outwardly and rearwardly as at 11, the rearwardly extended portion closely engaging the flanges to strengthen the same.

The gauge is supported between adjacent rods 9 and held in position by the upper and lower spring members 12, which have curved ends 13 fitted around the inner surfaces of the rods 9 to the end that the gauge may be readily and easily removed and replaced by another gauge having openings formed various distances apart.

It is to be understood that a number of these gauges are to be used in connection with a gas tank, there being provided a gauge for each change in the price per gallon of gasoline, and due to the construction as shown and described, it will be seen that a gauge, when once positioned, may be adjusted vertically so that the uppermost opening of the gauge may be properly positioned with respect to the fluid level in the tank when the tank is filled.

Rectangular openings 14 are formed in the gauge which openings are arranged in such a way that the lateral corners thereof will be in a direct horizontal line so that a reading may be taken when the quantity of gasoline, or level of the gasoline in the tank reaches this horizontal line.

As shown, a gauge is provided wherein the price of gasoline is 23 cents per gallon, the numbers arranged adjacent to the openings representing the price of the gasoline drawn from the tank when the gasoline level in the tank has reached the particular opening.

Thus it will be seen that due to this construction, a person may purchase 50 cents worth of gasoline or any quantity of gasoline by price, and not by quantity, thereby simplifying the sale of gasoline and rendering it easy for persons purchasing gasoline to determine whether or not they have obtained the proper amount of gasoline for which they have paid.

I claim:

In combination with the transparent tank of a gasoline dispensing stand, and the rods arranged adjacent thereto, a gauge including an elongated body portion having cut out portions to permit the contents of the tank to be viewed therethrough, said body portion having flanges formed along the side edges, and spring members positioned over the body portion and having curved ends adapted to fit under the rods to secure the gauge in position.

In testimony that I claim the foregoing as my own, I have hereto affixed my signature.

ANDREW P. HAWN.